United States Patent
Maruyama et al.

(10) Patent No.: US 7,669,022 B2
(45) Date of Patent: Feb. 23, 2010

(54) COMPUTER SYSTEM AND DATA MANAGEMENT METHOD USING A STORAGE EXTENT FOR BACKUP PROCESSING

(75) Inventors: Naoko Maruyama, Yokohama (JP); Yuichi Taguchi, Sagamihara (JP); Hiroshi Nasu, Yokohama (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 400 days.

(21) Appl. No.: 11/639,790

(22) Filed: Dec. 14, 2006

(65) Prior Publication Data
US 2008/0104345 A1 May 1, 2008

(30) Foreign Application Priority Data
Oct. 26, 2006 (JP) .............................. 2006-291845

(51) Int. Cl.
*G06F 13/00* (2006.01)

(52) U.S. Cl. ...................................... 711/162; 711/161
(58) Field of Classification Search ................. 711/161, 711/162
See application file for complete search history.

(56) References Cited

U.S. PATENT DOCUMENTS

| 6,611,901 B1 * | 8/2003 | Micka et al. ................. 711/162 |
| 7,447,937 B2 * | 11/2008 | Grubbs et al. ................... 714/6 |
| 2002/0144069 A1 | 10/2002 | Arakawa et al. |
| 2004/0024808 A1 * | 2/2004 | Taguchi et al. ............... 709/203 |
| 2004/0230859 A1 * | 11/2004 | Cochran et al. ................. 714/2 |

FOREIGN PATENT DOCUMENTS

| JP | 11-242570 A | 9/1999 |
| JP | 2002-297456 A | 10/2002 |

* cited by examiner

*Primary Examiner*—Tuan V Thai
*Assistant Examiner*—Duc T Doan
(74) *Attorney, Agent, or Firm*—Sughrue Mion, PLLC

(57) ABSTRACT

A computer system for preventing data loss that includes: a first storage system having a data storage extent for storing data sent from a host computer; a second storage system having at least one actual replicated data storage extent associated with the data storage extent; an archive appliance having a storage medium associated with the replicated data storage extent in the second storage system; and a data copy unit for controlling copy processing for reading data from the data storage extent in the first storage system and writing the read data to a first actual replicated data storage extent in the second storage system in accordance with specific configuration information. The system also has a connection switching unit for changing the specific configuration information so that a second actual replicated data storage extent, instead of the first actual replicated data storage extent, is associated with the data storage extent.

15 Claims, 17 Drawing Sheets

PAIRING INFORMATION MANAGEMENT TABLE

| DATA STORAGE EXTENT IDENTIFIER | VIRTUAL REPLICATED DATA STORAGE EXTENT IDENTIFIER |
|---|---|
| A1:00 | A2:00 |
| A1:01 | A2:01 |
| A1:02 | A2:02 |
| : | : |

FIG.4

COPY STATUS MANAGEMENT TABLE

| DATA STORAGE EXTENT IDENTIFIER | VIRTUAL REPLICATED DATA STORAGE EXTENT IDENTIFIER | COPY PROCESSING STATUS | COPY PROCESSING END TIME |
|---|---|---|---|
| A1:00 | A2:00 | NORMAL END | 2006/XX/10 12:00 |
| A1:01 | A2:01 | ABNORMAL END | - |
| A1:02 | A2:02 | ABNORMAL END | - |
| : | : | : | : |

FIG.5

VIRTUALIZATION INFORMATION MANAGEMENT TABLE

| VIRTUAL REPLICATED DATA STORAGE EXTENT IDENTIFIER | STORAGE SYSTEM IDENTIFIER | ACTUAL REPLICATED DATA STORAGE EXTENT IDENTIFIER |
|---|---|---|
| A2:00 | 1410 | B1:00 |
| A2:01 | 1410 | B1:01 |
| A2:02 | 1410 | B1:02 |
| : | : | : |

FIG.6A

UPDATED VIRTUALIZATION INFORMATION MANAGEMENT TABLE

| VIRTUAL REPLICATED DATA STORAGE EXTENT IDENTIFIER | STORAGE SYSTEM IDENTIFIER | ACTUAL REPLICATED DATA STORAGE EXTENT IDENTIFIER |
|---|---|---|
| A2:00 | 1410 | B1:00 |
| A2:01 | 1410 | B1:01 |
| A2:02 | 1410 | B1:03 |
| : | : | : |

FIG.6B

SYSTEM CONFIGURATION INFORMATION MANAGEMENT TABLE

| STORAGE SYSTEM IDENTIFIER | STORAGE EXTENT IDENTIFIER | STORAGE EXTENT STATUS (USED/UNUSED) | STORAGE CAPACITY |
|---|---|---|---|
| 1400 | A1:00 | USED | 100MB |
| : | : | : | : |
| 1400 | A2:00 | USED | 100MB |
| 1400 | A2:01 | USED | 200MB |
| : | : | : | : |
| 1410 | B2:03 | UNUSED | 200MB |
| 1410 | B2:04 | UNUSED | 200MB |
| : | : | : | : |

FIG.8

BACKUP CONFIGURATION INFORMATION MANAGEMENT TABLE

| BACKUP SOURCE | | BACKUP DESTINATION | |
|---|---|---|---|
| STORAGE SYSTEM IDENTIFIER | DATA STORAGE EXTENT IDENTIFIER | ARCHIVE APPLIANCE IDENTIFIER | STORAGE MEDIUM IDENTIFIER |
| 1400 | B1:00 | 15 | C05 |
| 1410 | B1:01 | 15 | C10 |
| 1410 | B1:02 | 15 | C15 |
| 1410 | B1:03 | 15 | C20 |
| 1410 | B1:04 | 16 | D05 |
| : | : | : | : |

FIG.10

REPLICATED DATA GENERATION MANAGEMENT TABLE

| GENERATION NUMBER | COPY PROCESSING END TIME | ARCHIVE APPLIANCE IDENTIFIER | STORAGE MEDIUM IDENTIFIER |
|---|---|---|---|
| 1 | 2006/XX/13 12:00 | 16 | D05 |
| 2 | 2006/XX/12 12:00 | 15 | C20 |
| 3 | 2006/XX/11 12:00 | 15 | C15 |
| 4 | 2006/XX/10 12:00 | 15 | C10 |
| : | : | : | : |

FIG.11

COMPUTER SYSTEM AND DATA MANAGEMENT METHOD USING A STORAGE EXTENT FOR BACKUP PROCESSING

CROSS-REFERENCE TO RELATED APPLICATIONS

This application relates to and claims priority from Japanese Patent Application No. 2006-291845, filed on Oct. 26, 2006, the entire disclosure of which is incorporated herein by reference.

BACKGROUND

1. Field of the Invention

The present invention relates to a computer system including a host computer and storage systems. More specifically, the present invention relates to a method for data transfer and data management between storage systems.

2. Description of Related Art

Computer systems generally execute "backup" processing to preserve replica or compressed data of the original data on storage media such as magnetic disks or magnetic tapes, in case of data loss due to system failure, bugs in software, human error, etc. Backup processing in computer systems is normally executed periodically based on a backup schedule.

The "D2D2T (Disk to Disk to Tape)" system is a known backup system. In this "D2D2T" system, data used in a host computer or similar is stored on magnetic disks, the data is backed up as a primary backup on different magnetic disks, and further the backed-up data is also saved to magnetic tapes as a secondary backup. A system that realizes the above "D2D2T"-type system is typically provided with a magnetic disk device for storing the original data, a backup magnetic disk device for storing primary backup data, and a magnetic tape device for storing secondary backup data.

Japanese Patent Laid-open Publication No. 11-242570 discloses a technique to provide an external storage system with a backup magnetic disk device and a tape library device having a plurality of magnetic tapes, and to automatically save data on a magnetic disk to a magnetic tape via a controller in the external storage system.

Further, Japanese Patent Laid-open Publication No. 2002-297456 discloses a technique to form a new route using another available device if a certain device on the route between the apparatuses necessary for backup processing becomes unavailable due to a device failure or similar, and to thereby reduce the extra backup processing time necessitated by the device failure.

SUMMARY

In the "D2D2T" backup system as discussed above, if an error occurs during processing to save data in a backup magnetic disk device to a magnetic tape, due to, for example, a failure in the backup magnetic disk device or magnetic tape, any unsaved data can no longer be stored on the magnetic tape. For example, if the backup magnetic disk is updated when it still includes data that has not yet been saved to the magnetic tape, that data will be overwritten, and it will be in vain if data on the backup magnetic disk is then saved to the magnetic tape. Accordingly, in order to maintain data consistency, it is necessary to not update data on the backup magnetic disk to the most recent data if some data on the backup magnetic disk has not yet been saved to the magnetic tape.

However, if updating data is prohibited as above, the most recent data cannot be backed up in the backup magnetic disk, at the risk of data loss.

Errors in the processing to save data in a backup magnetic disk device to a magnetic tape result from, for example, magnetic disk failures, failures on paths between the network devices, tape media or tape library device failures, lack of capacity in the tape media, or similar.

In order to overcome the above-described problems, according to an aspect of the invention, provided is: a computer system where data stored in a first storage system is backed up as a primary backup in a second storage system and further backed up as a secondary backup in an archive appliance; and in which, if an error occurs during backup processing, an storage extent (area) in which the data is backed up is switched depending on the reason for the error.

Specifically, according to an aspect of the invention, provided is a computer system including: a first storage system having a data storage extent for storing data sent from a host computer; a second storage system connected to the first storage system, and having at least one actual replicated data storage extent associated with the data storage extent; and an archive appliance connected to the second storage system, and having a storage medium associated with the replicated data storage extent in the second storage system. The computer system has a data copy unit for controlling copy processing for reading data from the data storage extent in the first storage system and writing the read data to a first actual replicated data storage extent in the second storage system in accordance with specific configuration information, and also has a connection switching unit for changing the specific configuration information so that a second actual replicated data storage extent, instead of the first actual replicated data storage extent, is associated with the data storage extent.

The computer system further includes a backup control unit for controlling backup processing for reading data from the first actual replicated data storage extent in the second storage system and storing the read data in the storage medium in the archive appliance.

The backup control unit controls the backup processing asynchronously to the copy processing controlled by the data copy unit.

If the data copy unit ends the copy processing abnormally, the connection switching unit changes the specific configuration information, and new copy processing is requested of the data copy unit.

According to another aspect of the invention, provided is a data management method in a computer system provided with a first storage system having a data storage extent, a second storage system connected to the first storage system and having at least one actual replicated data storage extent, and an archive appliance connected to the second storage system and having a specific storage medium, the data management method comprising: a step of setting specific configuration information so that the data storage extent in the first storage system is associated with a first actual replicated data storage extent in the second storage system, and the first actual replicated data storage extent is associated with the specific storage medium in the archive appliance; a step of storing data sent from a host computer in the data storage extent; a step of executing copy processing for reading data from the data storage extent in the first storage system and writing the read data to the first actual replicated data storage extent in the second storage system in accordance with the specific configuration information; a step of detecting if the copy processing has ended abnormally or not; and a step of changing the specific configuration information so that a second actual replicated data storage extent, instead of the first actual replicated data storage extent, is associated with the data storage extent, if the copy processing is detected as having ended abnormally.

According to an aspect of the invention, even if backup processing ends abnormally, loss of the most recent data can be prevented.

Other aspects and advantages of the invention will be apparent from the following description and the appended claims.

BRIEF DESCRIPTION OF THE DRAWINGS

FIG. 4 illustrates an example of a pairing information management table in a storage system according to an embodiment of the invention.

FIG. 5 illustrates an example of a copy status management table in a storage system according to an embodiment of the invention.

FIG. 6A and FIG. 6B illustrate an example of a virtualization information management table in a storage system according to an embodiment of the invention.

FIG. 8 is a diagram illustrating an example of a system configuration information management table in a management computer according to an embodiment of the invention.

FIG. 10 illustrates an example of a backup configuration information management table in a backup control computer according to an embodiment of the invention.

FIG. 11 illustrates an example of a replicated data generation management table in a backup control computer according to an embodiment of the invention.

DETAILED DESCRIPTION OF PREFERRED EMBODIMENT

Embodiments of the present invention will be explained with reference to the attached drawings.

Figure 1:
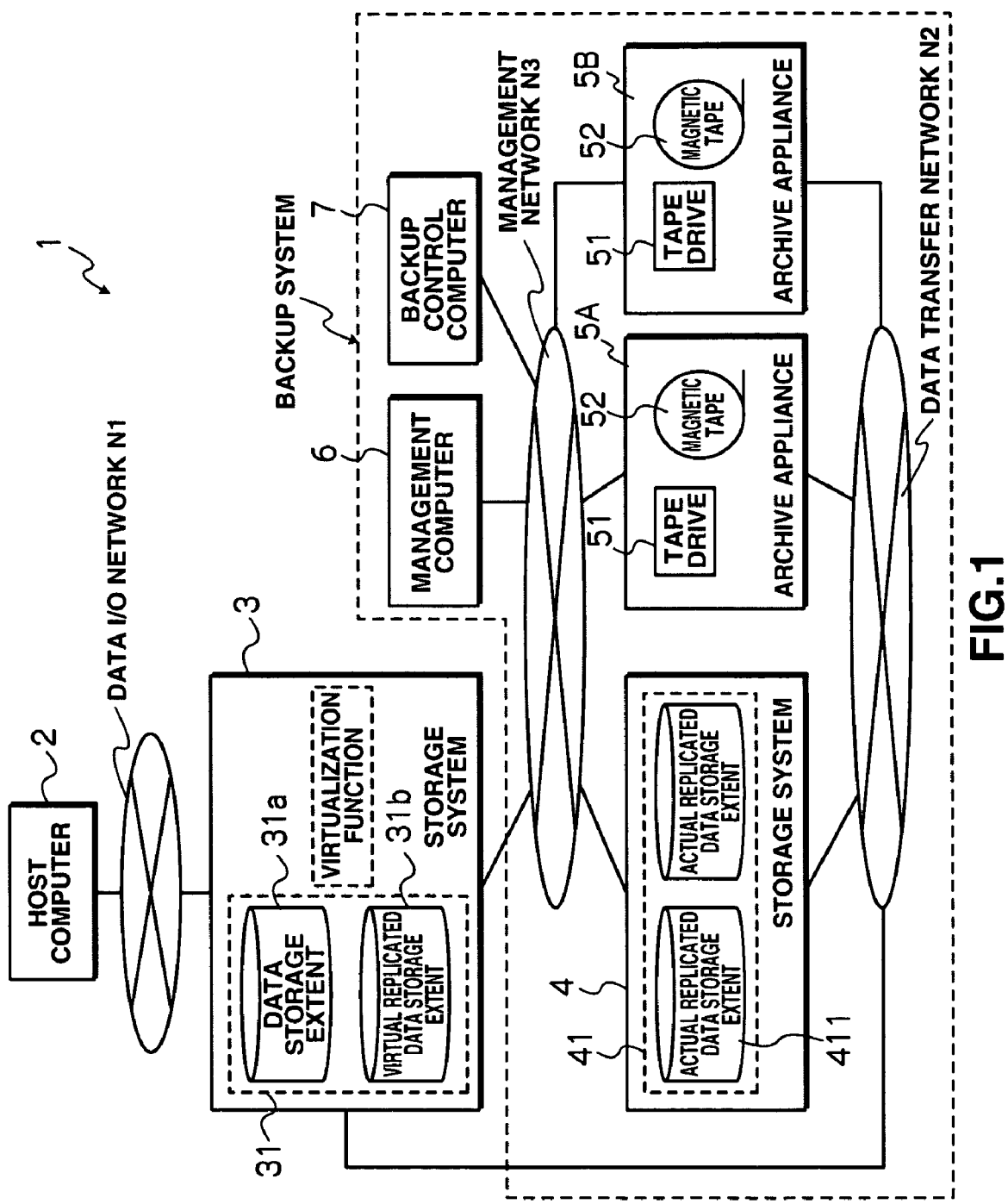
FIG. 1 is a diagram illustrating the configuration of a computer system according to an embodiment of the invention.

FIG. 1 is a diagram illustrating the configuration of a computer system according to an embodiment of the invention. As shown in FIG. 1, a computer system 1 includes a host computer 2 and a storage system 3 interconnected via a data I/O network N1. The computer system 1 also includes a backup system composed of a storage system 4; archive appliances 5A and 5B; a management computer 6; and a backup control computer 7. The storage system 3, storage system 4, and archive appliances 5A and 5B are interconnected via a data transfer network N2, and they are also connected to the management computer 6 and the backup control computer 7 via a management network N3.

The data I/O network N1 and the data transfer network N2 may be, for example, a LAN or internet (based on IP network technology), a SAN (based on Fibre Channel technology), or other known networks such as a public line or a dedicated line. The networks N1 and N2 are illustrated as different networks in FIG. 1, but they may also be configured as one network.

Likewise, the management network N3 may be configured as a LAN or internet (based on IP network technology). The management network N3 may also be configured as (part of) a network shared by other networks, instead of an independent network.

Typically, the storage system 3 is a storage system composed of at least one magnetic disk device 31. In the magnetic disk device 31, one or more logical volumes (storage extents) are formed. In this embodiment, a data storage extent 31a that is accessed by the host computer 2 and a virtual replicated data storage extent 31b are defined in the magnetic disk device 31. One data storage extent 31a is mutually associated with one or more virtual replicated data storage extents 31b. Instead of the magnetic disk device 31, a semiconductor storage device may also be used.

Write data associated with a write command sent from the host computer 2 is stored in specific blocks formed in a storage extent 31a. Also, the replicated data for data stored in a data storage extent 31a at a specific point in time is virtually stored in a virtual replicated data storage extent 31b. In other words, the virtual replicated data storage extent 31b stores not the replicated data itself, but metadata, such as an address or link, for the data to be stored. The entity of the replicated data is stored in an actual replicated data storage extent 411 in the storage system 4. The above-mentioned address or link may be, for example, the identifier for the storage system 4 and/or the identifier for the actual replicated data storage extent 411.

The storage system 4 is also typically a storage system composed of at least one magnetic disk device 41, having one or more actual replicated data storage extents 411. The actual replicated data storage extents 411 in the storage system 4 are associated with the virtual replicated data storage extents 31b, and by storing the actual replicated data, they function as the replicas of the data storage extents 31a.

In this embodiment, via a virtualization function installed in the storage system 3, processing for primary data backup to the virtual replicated data storage extents 31b is actually processing executed for primary data backup to the actual replicated data storage extents 411 in the storage system 4, which is connected via the data transfer network N2.

Typically, the archive appliances 5A and 5B are tape library appliances with magnetic tapes as storage media. For the archive appliances 5A and 5B, devices that have a larger capacity and achieve lower cost per bit, and thus are of a relatively slower data write/read speed than the above-described storage systems composed of magnetic disks are generally selected. So this embodiment is premised on using tape library appliances, but the archive appliances 5A and 5B are not limited to those. Also, the archive appliances 5A and 5B may be of different types.

Each of the archive appliances 5A and 5B has one or more tape drives 51 and one or more magnetic tapes 52 installed in the tape drives. For example, the magnetic tape(s) 52 are installed in a drive slot in the tape drive 51 using a changer, and the tape drive 51 accesses (e.g. reads/writes data from/to) the installed magnetic tapes 52. Where several tape drives 51 are provided, access is performed in parallel.

The management computer 6 is a computer for maintaining and managing the overall computer system 1. The management computer 6 may be a general-purpose computer provided with a maintenance and management function, or may be configured as a service processor (SVP) computer for executing maintenance and management only. The management computer 6 provides the system administrator with a user interface with which the administrator inputs various commands necessary for maintenance and management, or the management computer 6 controls the backup control computer 7 in accordance with predetermined processing.

The backup control computer 7 is a computer for controlling data backup processing between the storage system 4 and the archive appliances 5. The backup control computer 7 may be a general-purpose computer provided with a data transfer function for the backup processing, or may be a control computer only used for backup control. Also, instead of configuring the backup control computer 7 as a separate apparatus, the backup control computer may be implemented by, for example, installing some or all of its functions in the management computer 6 or in the storage system 4. Under the control of the management computer 6, and asynchronously to write processing based on the virtualization function in the storage system 3, the backup control computer 7 reads data from an actual replicated data storage extent 411 in the storage system 4, transfers it to a specific storage medium (i.e., magnetic tape 52) in a specific archive appliance 5, and thereby executes secondary backup processing for data stored in the actual replicated data storage extent 411 in the storage system 4. Also, the backup control computer 7 manages data stored in the archive appliances 5 by generation.

Figure 2:
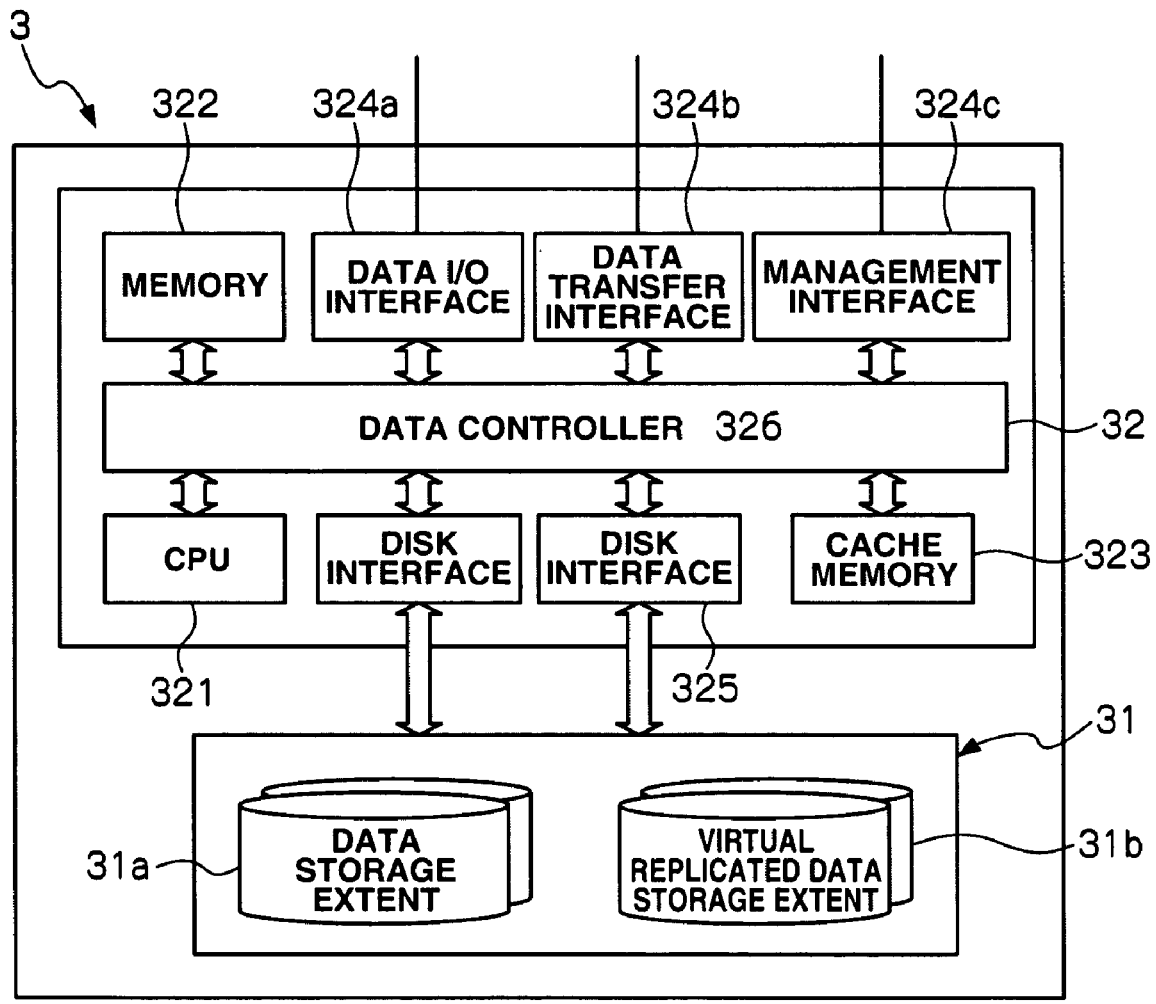
FIG. 2 is a diagram explaining the configuration of a storage system according to an embodiment of the invention.

FIG. 2 is a diagram explaining the configuration of a storage system 3 according to an embodiment of the invention.

As described before, the storage system 3 includes at least one magnetic disk device 31 and a controller unit 32. A storage extent provided by the magnetic disk device 31 is divided into one or more logical storage extents (volumes). The definition details for each storage extent are stored in the controller unit 32 as system configuration information. In this embodiment, one or more sets of a data storage extent 31a and its corresponding virtual replicated data storage extent 31b are defined. Each data storage extent 31a is a storage extent that the host computer 2 can access, and it stores data used in the host computer 2. Also, each virtual replicated data storage extent 31b virtually stores the replicated data for data stored in the relevant data storage extent 31a at a particular point in time.

Referring to FIG. 2, the controller unit 32 is a system circuit mainly including a CPU 321, memory 322, and cache memory 323, and controls the overall input/output processing between the host computer 2 and the magnetic disk device 31. The controller unit 32 also has interfaces 324a-324c, and one or more disk interfaces 325. These system modules 321-325 are functionally connected to the data controller 326.

The local memory 322 functions as the main memory for the CPU 321. The local memory 322 is typically configured as a semiconductor storage system, but part of the local memory 322 may be provided by one or more specific logical volumes formed in the magnetic disk device 31. The local memory 322 stores various control programs, system configuration information, and various management tables (explained later) to be used by the CPU 321. These control programs, system configuration information and various management tables are, for example, read from specific volume(s) in the magnetic disk device 31, under the control of the CPU 321, when the storage system 3 is switched on, or the configuration information is collected based on an initial sequence, and then they are made available on the local memory 322 (or in a specific logical volume if necessary).

The cache memory 323 is used to temporarily store data. In this embodiment, it is used to temporarily store input/output data transmitted between the host computer 2 and the magnetic disk device 31. A command sent from the host computer 2 is temporarily stored in the cache memory 323, and data read out from the magnetic disk device 31 is temporarily stored in the cache memory 323 before being sent to the host computer 2. A general semiconductor storage system can be employed as the cache memory 323.

Each of the interfaces 324a-324c is a system circuit configured to enable communication via the networks N1-N3. In this embodiment, the interface 324a is connected to the data I/O network N1 and used for communication with the host computer 2. The interface 324b is connected to the data transfer network N2 and used for communication with the storage system 4. The interface 324c is connected to the management network N3 and used for communication with the management computer 6 and the backup control computer 7.

Figure 3:
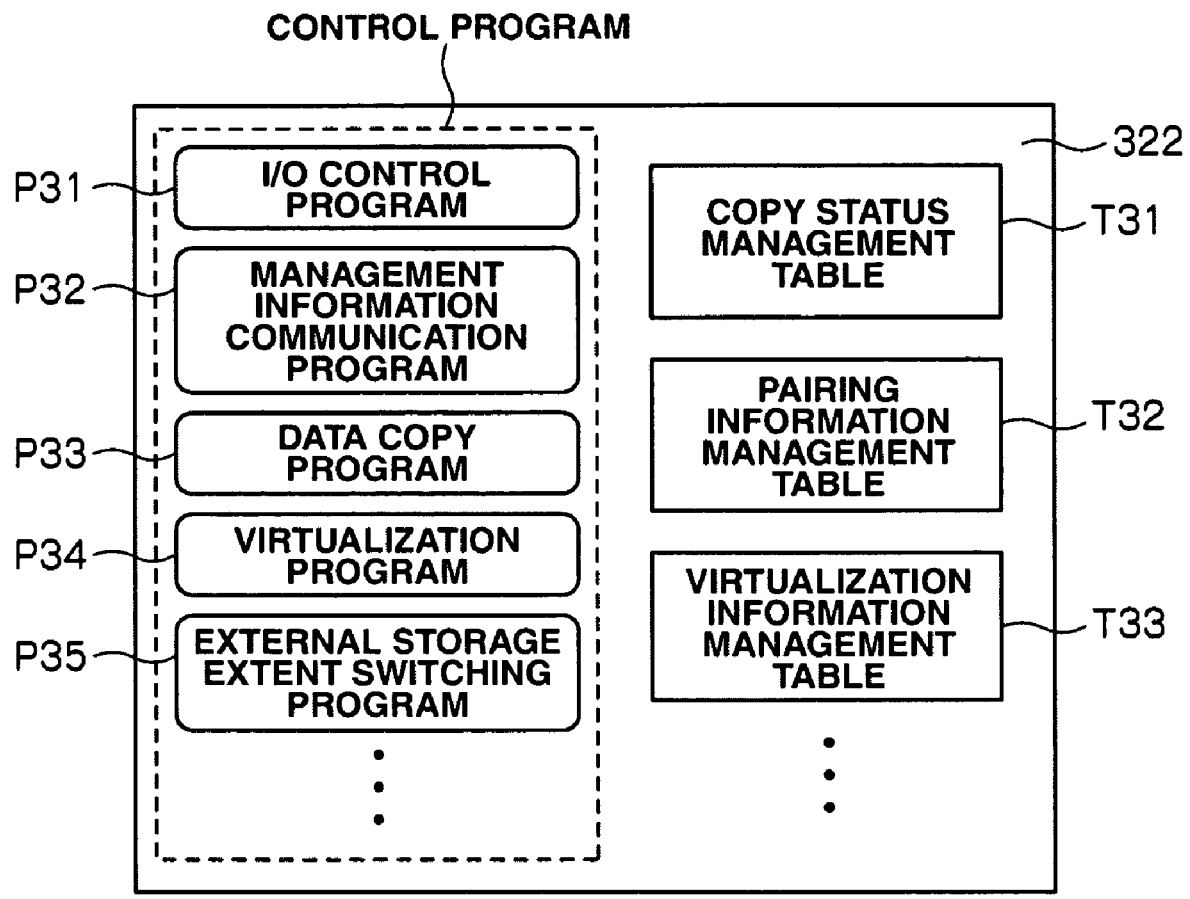
FIG. 3 is a diagram illustrating the content of local memory in a storage system according to an embodiment of the invention.

FIG. 3 is a diagram illustrating the content of local memory 322 in a storage system 3 according to an embodiment of the invention. As shown in FIG. 3, control programs including an I/O control program P31, a management information communication program P32, a data copy program P33, a virtualization program P34, and an external storage extent switching program P35 are installed in the local memory 322. Also, management tables including a copy status management table T31, a pairing information management table T32, and a virtualization information management table T33 are stored in the local memory 322.

The I/O control program P31 is a program that interprets a command sent from the host computer 2 and realizes the corresponding processing. For example, if a command from the host computer 2 is a write request, the I/O control program P31 writes the relevant write data to the data storage area in the disk device 31 designated in the write request. The data storage area is, for example, a collection of blocks of a specific size, formed by dividing the data storage extent 31a. On the other hand, if a command is a read request, the I/O control program P31 controls the control unit 32 so that the relevant data is read from the data storage area in the disk device 31 designated in the read request, and sent to the host computer 2.

The management information communication program P32 is a program for the storage system 3 to send/receive management information to/from the devices in which the corresponding management information communication programs are installed (i.e., the management computer 6 and backup control computer 7). The management information communication program P32 controls execution of other programs based on received management information, or executes processing for the various management tables. For example, if the management information communication program P32 receives a data copy request from the management computer 6, it informs the data copy program P33 of that request so that execution control will be transferred to the data copy program P33.

The data copy program P33 is a program for, in response to a data copy request, replicating data in the data storage extent 31a as of the requested point in time and storing the replicated data in the virtual replicated data storage extent 31b. However, as described before, the virtual replicated data storage extent 31b does not store the replicated data itself, and the replicated data is actually sent to the storage system 4 by the cooperating virtualization program P34 via the data transfer network N2, and stored in the corresponding actual replicated data storage extent 411 in the storage system 4. Information associating the data storage extent 31a that stores replication source data with the virtual replicated data storage extent 31b that is the destination for the replicated data (hereinafter referred to as "pairing information") is stored in the paring information management table T32. The data copy program P33 also operates to reflect information concerning the data copy processing status in the copy status management table T31. Moreover, when the copy processing ends, the data copy program P33 writes that end time in the copy status management table T31.

The virtualization program P34 is a program for realizing the virtualization function in the storage system 3. The virtualization program P34 sends an access request (e.g. write/read request) for a virtual replicated data storage extent 31b to the storage system 4, as an access request for the actual replicated data storage extent 411 in the storage system 4 that is associated with the above virtual replicated data storage extent 31b in the virtualization information management table. With execution of the virtualization program P34, a data access request targeting a virtual replicated data storage extent 31b is executed targeting the relevant actual replicated data storage extent 411 in the storage system 4 via the data transfer network N2. For example, if the data copy program P33 is going to write the replica of data stored in a data storage extent 31a to the relevant virtual replicated data storage extent 31b, the virtualization program P34 refers to the virtualization information management table T33, and sends an access request to the storage system 4 so that the replicated data will be written to the actual replicated data storage extent 411 in the storage system 4 that is associated with the above virtual replicated data storage extent 31b.

The external storage extent switching program P35 is a program for rewriting the content recorded in the virtualization information management table T33 and thereby changing the association between the virtual replicated data storage extent 31b and the actual replicated data storage extent 411. More specifically, if the external storage extent switching program P35 receives an external storage extent switching request from the management computer 6 via the management information communication program P32, the program P35 changes the identifier for the actual replicated data storage extent 411 in the storage system 4, the identifier being currently associated with the virtual replicated data storage extent 31b in the virtualization information management table T33, based on the received request. In other words, the external storage extent switching program P35 rewrites, in the virtualization information management table T33, the identifiers for the data storage extent 31a and the actual replicated data storage extent 411, both being the areas from/to which data is actually read/written, to new identifiers designated in the external storage extent switching request.

FIG. 4 illustrates an example of a pairing information management table T32 in a storage system 3 according to an embodiment of the invention.

The pairing information management table T32 is a table configured to associate the identifier for a data storage extent with the identifier for a virtual replicated data storage extent. The data storage extent identifier is information for uniquely identifying a data storage extent 31a that stores replication source data. The virtual replicated data storage extent identifier is information for uniquely identifying a virtual replicated data storage extent 31b for storing replicated data. In accordance with the association between the data storage extent identifiers and virtual replicated data storage extent identifiers, the data copy program P33 specifies a virtual replicated data storage extent 31b associated with a particular data storage extent 31a. For example, data stored in the data storage extent 31a identified by a data storage extent identifier of "A1:00" will also be stored in the virtual replicated data storage extent 31b identified by a virtual replicated data storage extent identifier of "A2:00."

FIG. 5 illustrates an example of a copy status management table T31 in a storage system 3 according to an embodiment of the invention.

The copy status management table T31 is a table for managing the status of data copy between the mutually associated data storage extent 31a and virtual replicated data storage extent 31b, and it includes information concerning a data storage extent identifier, a virtual replicated data storage extent identifier, the status of the copy processing, and the end time of the copy processing. The status of the copy processing is updated according to the progress in the processing by the data copy program P33. For example, "IN PROCESS," indicating that data copy is currently being executed; "ABNORMAL END," indicating that a failure has occurred during data copy; or "NORMAL END," indicating that data copy has successfully ended, is stored. For example, the first entry in FIG. 5 shows that data copy successfully ended from the data storage extent "A1:00" to the virtual replicated data storage extent "A2:00." Also, for example, an error code indicating the type of error may be stored in the copy processing status. The end time of the copy processing indicates the time when the copy processing ended. If the copy processing ends abnormally, no end time is given for that copy processing.

FIG. 6 illustrates an example of a virtualization information management table T33 in a storage system 3 according to an embodiment of the invention.

The virtualization information management table T33 defines the association of a virtual replicated data storage extent 31b in the storage system 3 with an actual replicated data storage extent 411 in the storage system 4, for which write/read processing for the virtual replicated data storage extent 31b is actually executed. The virtualization information management table T33 includes: a virtual replicated data storage extent identifier for uniquely identifying a virtual replicated data storage extent 31b in the storage system 3, that becomes a target of virtualization; a storage system identifier for uniquely identifying a storage system 4 having an actual replicated data storage extent 411 to which data is to be actually stored; and an actual replicated data storage extent identifier for uniquely identifying the above actual replicated data storage extent 411. For example, as shown in FIG. 6A, data to be written to the virtual replicated data storage extent 31b in the storage system 3 identified by a virtual replicated data storage extent identifier of "A2:00" is actually stored in the actual replicated data storage extent 411 identified by an actual replicated data storage extent identifier of "B1:00" in the storage system 4 identified by a storage system identifier of "1410."

The storage system 3 configured as above realizes desired operations under the control of the CPU 321, via execution of various programs. The storage system 4 is also configured to include the same hardware resources as those in the storage system 3. The storage system 4 does not necessarily need to include the data copy program P33, virtualization program P34, or external storage extent switching program P35, which are installed in the storage system 3. If the storage system 4 needs a virtualization function for the relationship with another storage system, those programs may be installed as necessary.

Figure 7:
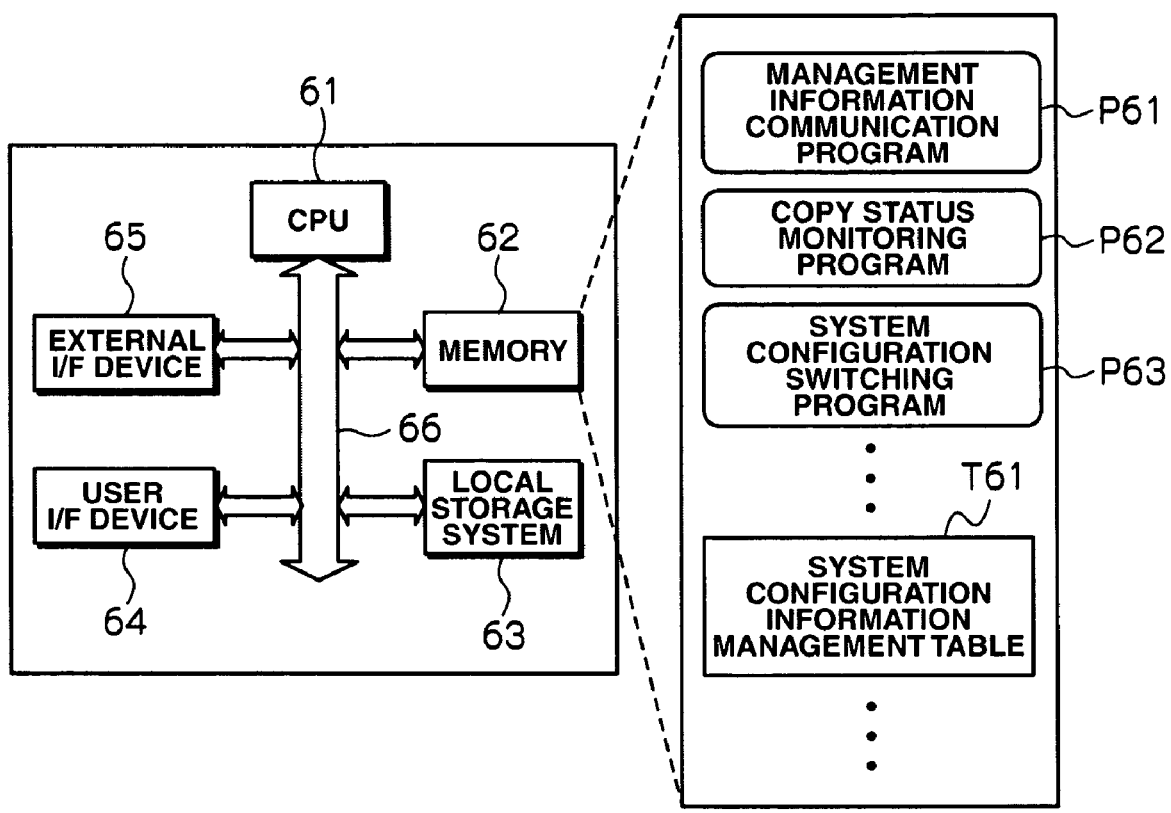
FIG. 7 is a diagram explaining the configuration of a management computer according to an embodiment of the invention.

FIG. 7 is a diagram explaining the configuration of a management computer 6 according to an embodiment of the invention. As shown in FIG. 7, the management computer 6 mainly has a CPU 61, memory 62, a local storage system 63, a user I/F device 64, and an external I/F device 65, and these are connected to each other via a bus 67.

The CPU 61 is in charge of controlling the overall management computer 6. The memory 62 functions as the main memory for the CPU 61, and stores various management programs and management tables to be used by the CPU 61. In this embodiment, the memory 62 stores, for example, a management information communication program P61, a copy status monitoring program P62, a system configuration switching program P63, a system configuration information management table T61, and the like. Those programs and management tables are, for example, read from the local storage system 63 and made available on the memory 62, under the control of the CPU 61, when the management computer 6 is powered on. The user I/F device 64 is a user interface provided for the system administrator. For example, the user I/F device 64 is composed of a keyboard and a mouse, mainly functioning as input devices, and a display and a printer mainly functioning as output devices. The external I/F device 65 is a communication interface provided with a port (not shown in the drawing) for connection with the management network N3.

The management information communication program P61 is a program for enabling the management computer 6 to send/receive management information to/from the storage system 3, storage system 4, and archive appliances 5A and 5B. In other words, the management information communication program P61 installed in the management computer 6 functions to realize communication with the management information communication program P32 installed in the storage system 3 (and in others). In accordance with the received management information, the management information communication program P61 controls execution of other programs, or executes processing for the various management tables based on the management information.

The copy status monitoring program P62 monitors the status of data copy processing executed for data copy from the storage system 3 to the storage system 4. If the copy status monitoring program P62 detects data copy processing that ended abnormally, it provides the system configuration switching program P63 with information about the relevant data copy processing.

The system configuration switching program P63 is a program for generating an external storage extent switching request to change the identifier for an actual replicated data storage extent 411 in the storage system 4, which is associated with a virtual replicated data storage extent 31b in the virtualization information management table T33 in the storage system 3. An external storage extent switching request generated by the system configuration switching program P63 is sent to the storage system 3 by the management information communication program P61.

The system configuration information management table T61 stores system configuration information and information about the status (used/unused) of storage extents (volumes), with respect to all storage systems in the computer system 1, i.e., the storage system 3, storage system 4, and archive appliances 5A and 5B. The system configuration information is information about the identifiers and capacity, etc., for the storage extents in each storage system. Also, the storage extent status (used/unused) is information that indicates whether the storage extent is available for data write/read.

FIG. 8 is a diagram illustrating one example of a system configuration information management table T61 in a management computer 6 according to an embodiment of the invention. The system configuration information management table T61 stores information concerning the system configuration, including: a storage system identifier for uniquely identifying each storage system in the computer system 1 (i.e., the storage systems 3 and 4, and the archive appliances 5); a storage extent identifier for uniquely identifying a storage extent in each storage system; the status (used/unused) of the storage extent; and the capacity value of the storage extent. The status (used/unused) of the storage extent is for example shown by whether the storage extent has been mounted or not. If it has been mounted, "USED" is stored, and if not, "UNUSED" is stored. The storage extent identifier includes an identifier for each of the data storage extent 31a, virtual replicated data storage extent 31b, and actual replicated data storage extent 411.

Figure 9:
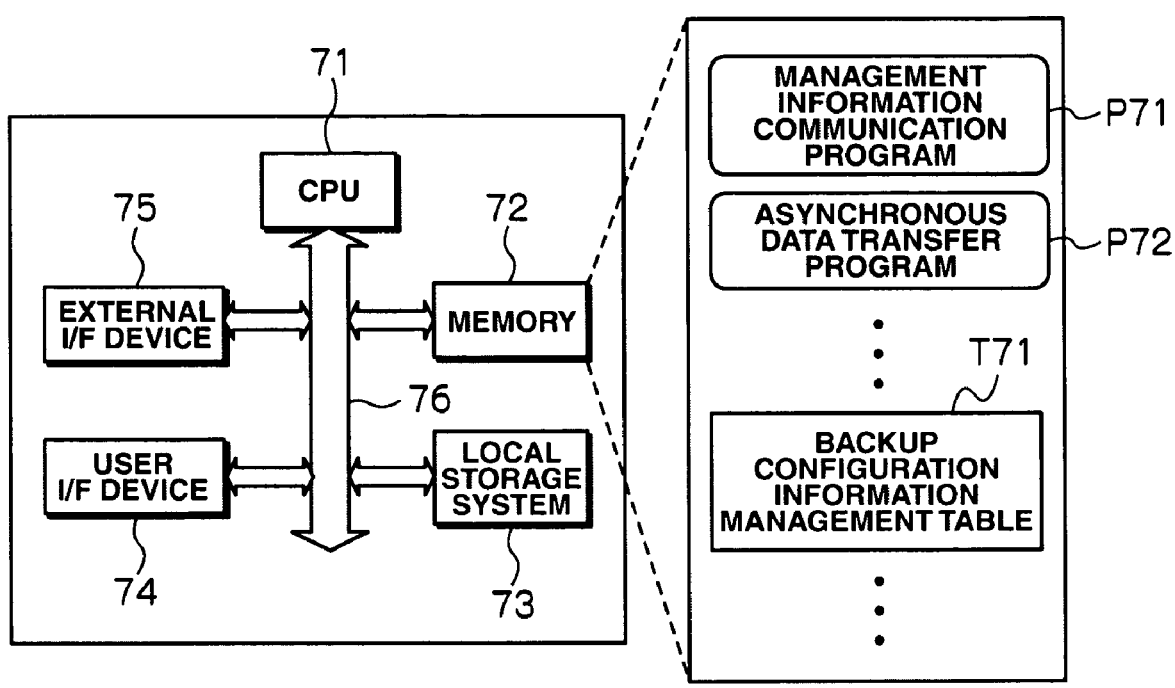
FIG. 9 is a diagram explaining the configuration of a backup control computer according to an embodiment of the invention.

FIG. 9 is a diagram explaining the configuration of a backup control computer 7 according to an embodiment of the invention. As shown in FIG. 9, the backup control computer 7 mainly has a CPU 71, memory 72, a local storage system 73, a user I/F device 74, and an external I/F device 75, and these are connected to each other via a bus 77. A general-purpose computer may also be used for the backup control computer 7, for example, as is the case with the management computer 6.

The CPU 71 is in charge of controlling the overall backup control computer 7. The memory 72 functions as the main memory for the CPU 71, and stores various management programs and management tables to be used by the CPU 71. In this embodiment, the memory 72 stores, for example, a management information communication program P71, an asynchronous data transfer program P72, a backup configuration information management table T71, a replicated data generation management table T72, and the like. Those programs and management tables are, for example, read from the local storage system 73 and made available on the memory 72, under the control of the CPU 71, when the backup control computer 7 is powered on. The user I/F device 74 is a user interface provided for the system administrator. For example, the user I/F device 74 is composed of a keyboard and a mouse, mainly functioning as input devices, and a display and a printer mainly functioning as output devices. The external I/F device 75 is a communication interface provided with a port (not shown in the drawing) for connection with the management network N3.

The management information communication program P71 is a program for enabling the backup control computer 7 to send/receive management information to/from the management computer 6, storage system 3, storage system 4, and archive appliances 5A and 5B. In other words, the management information communication program P71 installed in the backup control computer 7 functions to achieve communication with the management information communication program P32 installed in the storage system 3 (and in other systems). In accordance with the received management information, the management information communication program P71 controls execution of other programs, or executes processing for the various management tables based on the management information.

The asynchronous data transfer program P72 is a program for realizing processing for transferring data written to an actual replicated data storage extent 411, to a specific storage medium (i.e., a specific magnetic tape 52) in the archive appliances 5, the processing being executed asynchronously to the write processing via the virtualization function in the storage system 3. When data has been written to the actual replicated data storage extent 411, which is the transfer source, the asynchronous data transfer program P72 refers to the backup configuration information management table T71, and decides on a magnetic tape 52, as the transfer destination for the above transfer source actual replicated data storage extent 411.

As shown in FIG. 10, the backup configuration information management table T71 is a table for associating an actual replicated data storage extent 411 in each storage system 4, which is a transfer source (backup source), with a magnetic tape 52 in the archive appliance 5, which is the corresponding transfer destination (backup destination). The backup configuration information management table T71 includes: a storage system identifier assigned for each storage system 4, which is a transfer source; a data storage extent identifier assigned for a data storage extent 31a in each storage system 4; an archive appliance identifier assigned for each archive appliance 5; and a storage medium identifier assigned for a storage medium in each archive appliance 5. For example, data stored in the actual replicated data storage extent 411 identified by a data storage extent identifier of "B1:00" in the storage system 4 identified by a storage system identifier of "1410" is asynchronously transferred to the magnetic tape 52 identified by a magnetic tape identifier of "C05" in the archive appliance 5A identified by an archive appliance identifier of "15."

The replicated data generation management table T72 is a table for managing the generations of the backup data in the archive appliances 5. FIG. 11 is a diagram illustrating one example of a replicated data generation management table according to an embodiment of the invention. More specifically, FIG. 11 shows the backup data for the data storage extent 31a identified by a data storage extent identifier of "A1:02," as an example. The replicated data generation management table includes, for example, a generation number, the time when the replicated data was obtained, an archive appliance identifier, and a storage medium identifier.

The generation number indicates the generation(s) of the replicated data obtained for a particular data storage extent 31a, and the latest generation is given "1." The time when the replicated data was obtained indicates a point in time when the relevant replicated data was obtained for data in the data storage extent 31a, and this time is obtained from the copy status management table T31 in the storage system 3. For example, when the data copy processing was completed for data copy from the data storage extent 31a identified by a data storage extent identifier of "A1:02" to the virtual replicated data storage extent 31b identified by a virtual replicated data storage extent identifier of "A2:02" is shown as that time.

When the secondary backup processing has ended via the execution of the asynchronous data transfer program P72, the management information communication program P71 updates the replicated data generation management table T72 to manage the generation of the backed up data. The time when the replicated data was obtained, to be stored in the replicated data generation management table T72 is obtained from the copy status management table T31 in the storage system 3.

Figure 12:
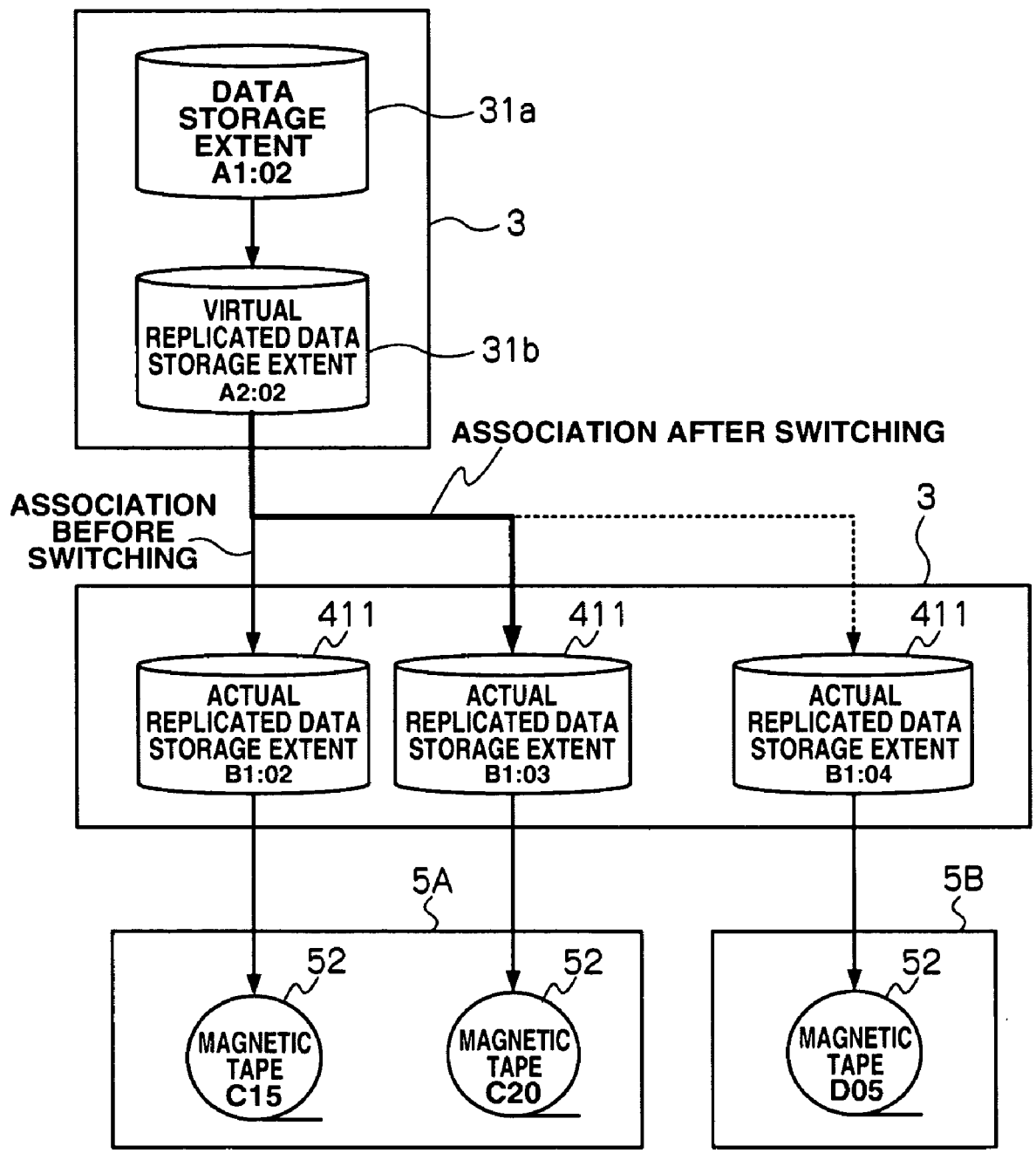
FIG. 12 is a diagram conceptually explaining external storage extent switching processing in a computer system according to an embodiment of the invention.

FIG. 12 is a diagram conceptually explaining external storage extent switching processing in a computer system 1 according to an embodiment of the invention.

FIG. 12 is illustrated based on the assumption that the paring information management table T32 defines the paring between the data volume 31a identified by a data volume identifier of "A1:02" and the virtual replicated data volume 31b identified by a virtual replicated data volume identifier of "A2:02," as shown in FIG. 4. FIG. 12 is also based on the assumption that the backup configuration information management table T71 associates the respective actual replicated data volumes 411 identified by actual replicated data volume identifiers of "B1:02," "B1:03," and "B1:04" with respective storage medium identifiers of "C15," "C20," and "D05," as shown in FIG. 10.

When the storage system 3 is going to generate the replica of data stored in the data storage extent 31a identified by a data storage extent identifier of "A1:02," using the data copy program P33, the replicated data will be stored, via the virtualization program P34, in the actual replicated data storage extent 411 identified by an actual replicated data storage extent identifier of "B1:02" associated with a virtual replicated data storage extent identifier of "A2:02."

Also, for example, if the storage system 3 receives an external storage extent switching request from the management computer 6, the storage system 3 updates the actual replicated data storage extent identifier "B1:02" in the virtualization information management table T33 to "B1:03," via the external storage extent switching program P35, As a result, the virtual replicated data storage extent 31b identified by a virtual replicated data storage extent identifier of "A2:02" is associated with the actual replicated data storage extent identifier "B1:03," and any future write request targeting the virtual replicated data storage extent 31b identified by a storage extent identifier of "A2:02" will be executed targeting the actual replicated data storage extent 411 identified by an actual replicated data storage extent identifier of "B1:03."

Figure 13:
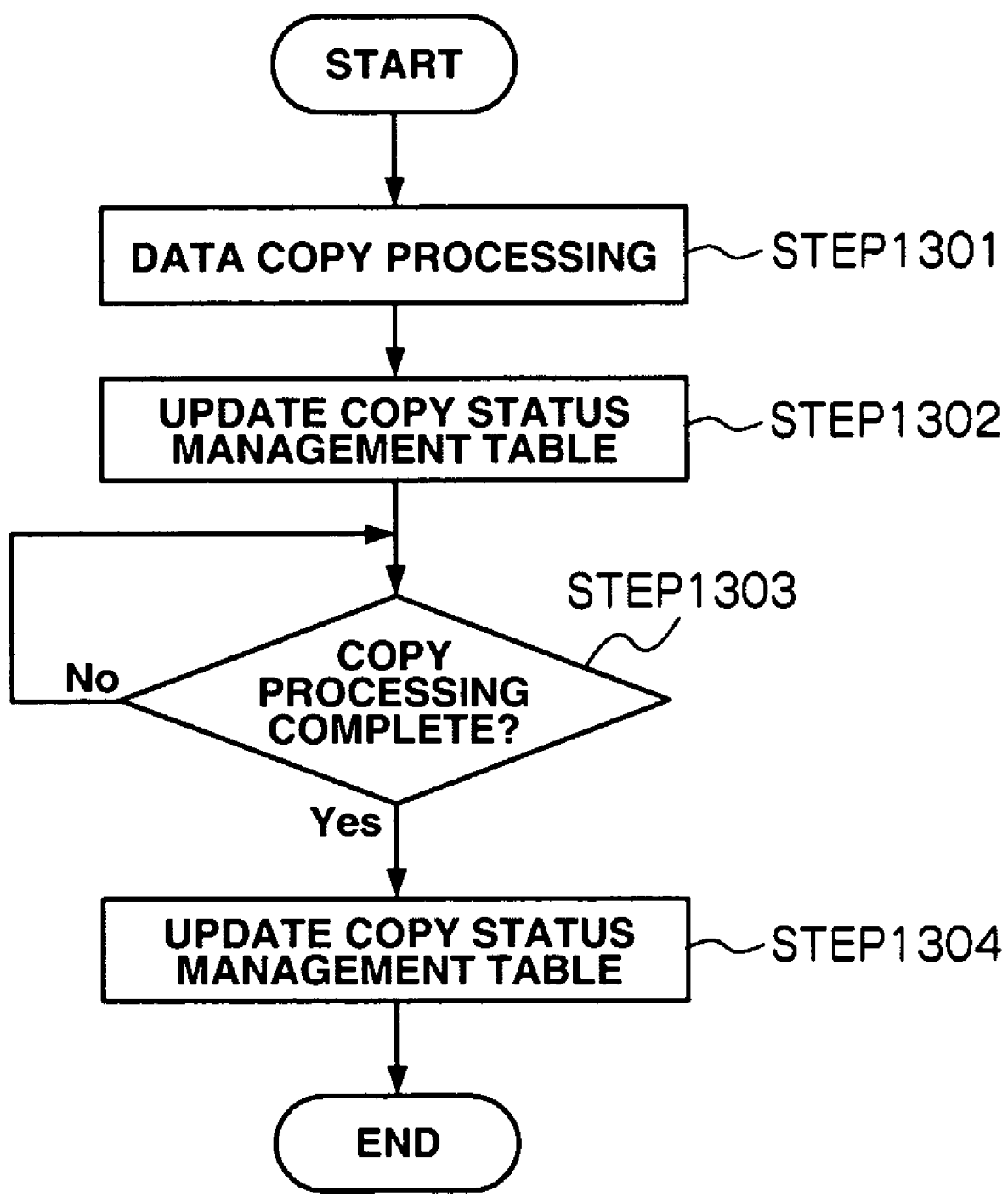
FIG. 13 is a flowchart explaining data copy processing in a storage system according to an embodiment of the invention.

FIG. 13 is a flowchart explaining data copy processing in a storage system 3 according to an embodiment of the invention. The data copy processing is realized via the execution of the data copy program P33.

First, in order to back up data, for example, in accordance with a backup schedule predetermined by the system administrator, the management computer 6 sends a data copy request to the storage system 3 via the execution of the management information communication program P61. In response to the above request, execution control is transferred from the management information communication program P32 in the storage system 3 to the data copy program P33. The data copy program P33 starts copy processing for replicating data stored in the data storage extent 31a in the virtual replicated data storage extent 31b (STEP 1301). At that time, the data copy program P33 updates the copy status management table T31 to show that the relevant data storage extent 31a is under the data copy processing (STEP 1302). After completing the data copy processing ("Yes" in STEP 1303), the data copy program P33 updates the copy status management table T31 based on how it ended (STEP 1304). More specifically, if the data copy processing ended successfully, the data copy program P33 writes "NORMAL END" to the copy status management table T31 and also writes the end time. If the data copy processing did not end successfully due to a certain reason, the data copy program P33 writes "ABNORMAL END" to the copy status management table T31, and ends the processing. The copy status management table T31 updated as described above is periodically monitored by the copy status monitoring program in the management computer 6.

Figure 14:
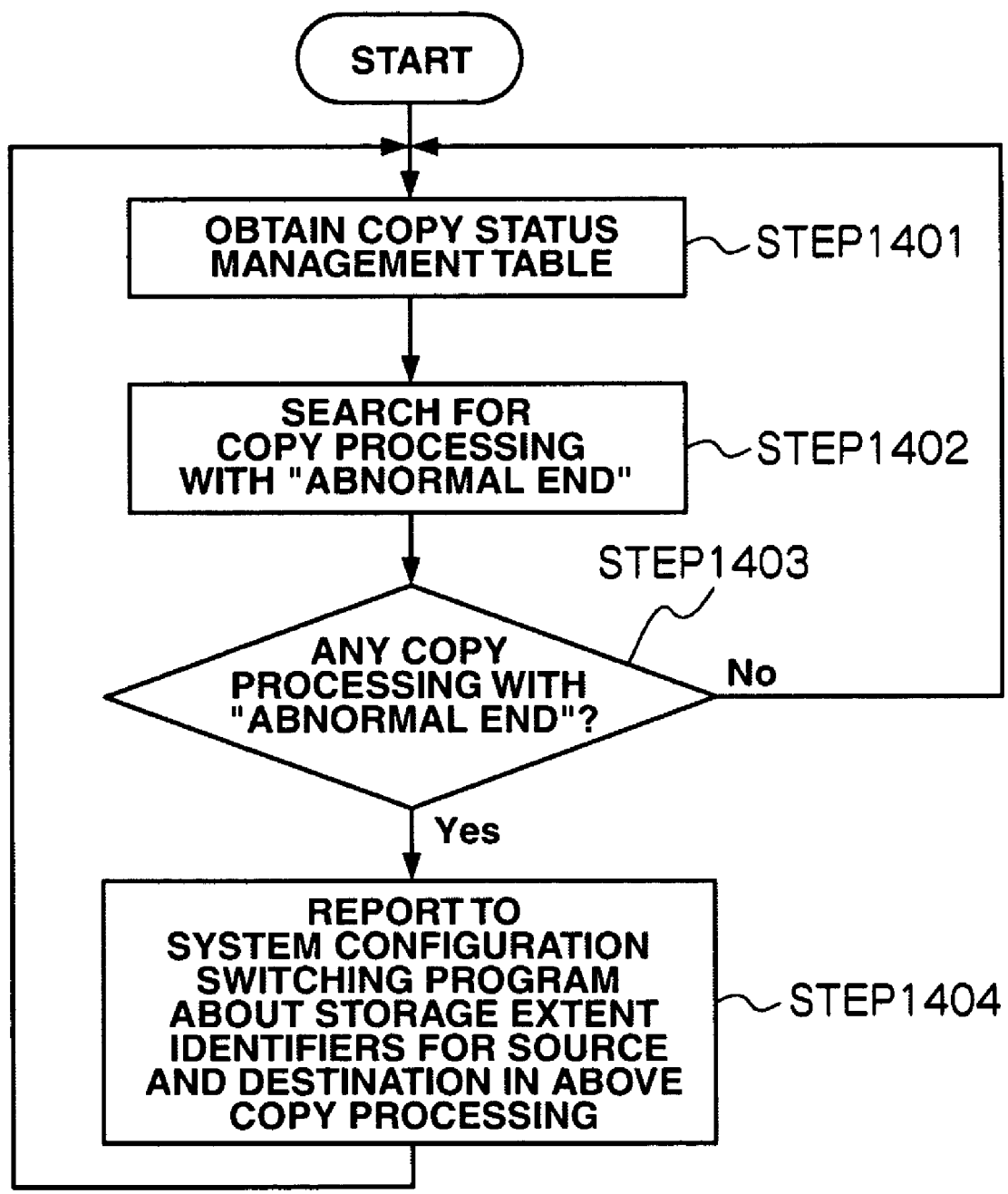
FIG. 14 is a flowchart explaining data copy status monitoring processing in a management computer according to an embodiment of the invention.

FIG. 14 is a flowchart explaining data copy status monitoring processing in a management computer 6 according to an embodiment of the invention. The data copy status monitoring processing is realized by the execution of the copy status monitoring program P62.

As shown in FIG. 14, the copy status monitoring program P62 obtains the copy status management table T31 from the storage system 3 via the management information communication program P61 at certain time intervals (STEP 1401). The copy status monitoring program P62 refers to the obtained copy status management table T31, and searches for data copy processing that ended abnormally (STEP 1402). If there is no copy processing that ended abnormally ("No" in STEP 1403), the copy status monitoring program P62 continues monitoring, standing by for the next obtainment.

If there is copy processing that ended abnormally ("Yes" in STEP 1403), the copy status monitoring program P62 obtains the identifiers for the data storage extent and the virtual replicated data storage extent, that are respectively the transfer source and the transfer destination in the relevant copy processing (STEP 1405). The copy status monitoring program P62 then provides the system configuration switching program P63 with the obtained storage extent identifiers (STEP 1406), and continues monitoring, standing by for the next obtainment.

In the above-explained example, the copy status monitoring program P62 refers to the copy status management table T31 in the storage system 3, but the present invention is not limited to this. For example, the data copy program P33 in the storage system 3 may send an error report to the management computer 6 every time the data copy program P33 detects any abnormality. That error report includes the identifiers for the data storage extent and the virtual replicated data storage extent, that are respectively the transfer source and the transfer destination in the copy processing that ended abnormally.

Figure 15:
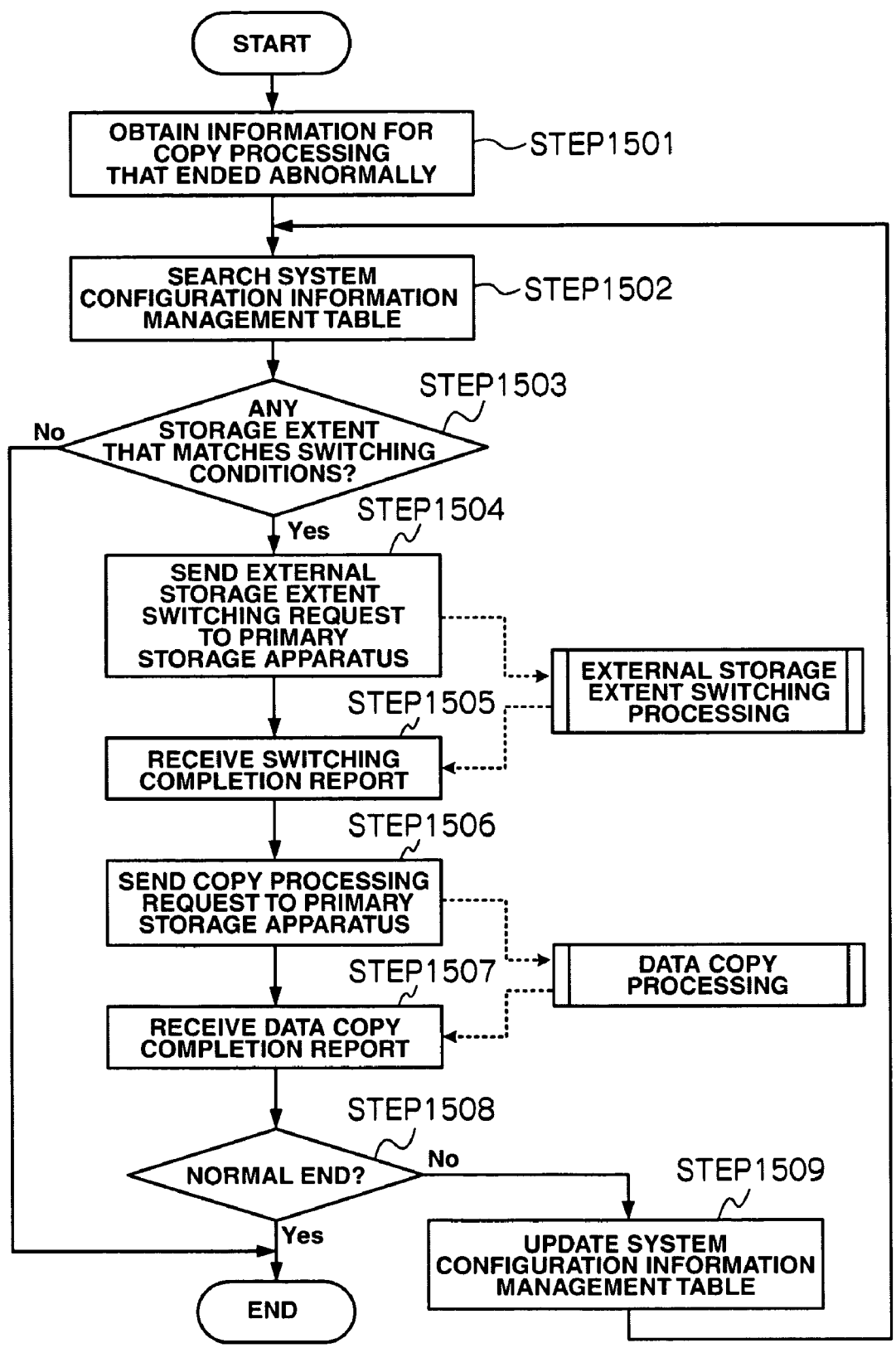
FIG. 15 is a flowchart explaining system configuration switching processing in a management computer according to an embodiment of the invention.

FIG. 15 is a flowchart explaining system configuration switching processing in a management computer 6 according to an embodiment of the invention. The system configuration switching processing is realized by the execution of the system configuration switching program P63.

If the system configuration switching program P63 receives, from the copy status monitoring program P62, the data storage extent identifier and the virtual replicated data storage extent identifier for the copy processing that ended abnormally (STEP 1501), the system configuration switching program P63 refers to the system configuration information management table T61, and searches for an actual replicated data storage extent 411 that can be the switching destination, in accordance with specific switching conditions (STEP 1502). More specifically, the system configuration switching program P63 retrieves, from among the storage extents with a status of "UNUSED" in the system configuration information management table T61, a storage extent in the same storage system as that of the pre-switching actual replicated data storage extent and having a storage capacity equal to or larger than that of the copy source data storage extent. If several storage extents are retrieved, the system configuration switching program P63, for example, selects the one recorded in the system configuration information management table T61 the earliest. After the system configuration switching program P63 selects the storage extent that matches the specific switching conditions ("Yes" in STEP 1503), the system configuration switching program P63 generates an external storage extent switching request including the switching source virtual replicated data storage extent identifier received from the copy status monitoring program P62 and the above-retrieved switching destination storage extent identifier, and sends it to the storage system 3 (STEP 1504). On the other hand, if there is no storage extent that matches the specific switching conditions, the system configuration switching program P63 ends the processing ("No" in STEP 1503).

When the storage system 3 receives an external storage extent switching request, execution control is transferred to the external storage extent switching program P35, and external storage extent switching processing is executed by the external storage extent switching program P35. When the external storage extent switching program P35 ends the external storage extent switching processing, it sends a switching completion report to the management computer 6. After receiving the switching completion report (STEP 1505), the system configuration switching program P63 in the management computer 6 sends a data copy processing request to the storage system 3 (STEP 1506). In other words, this is a retry request for the data copy processing that ended abnormally. In response, the storage system 3 starts new data copy processing via the execution of the data copy program P33, and when the processing ends, the storage system 3 sends a data copy completion report to the management computer 6. The system configuration switching program P63 then receives the data copy completion report (STEP 1507), and if the report indicates a normal end ("Yes" in STEP 1508), ends the processing. On the other hand, if the report indicates an abnormal end ("No" in STEP 1508), the system configuration switching program P63 updates the system configuration information management table T61, setting "UNAVAILABLE" in the storage extent status (used/unused) for the above selected storage extent (STEP 1509). In that case, the system configuration switching program P63 refers to the system configuration information management table T61 to select the next storage extent.

Figure 16:
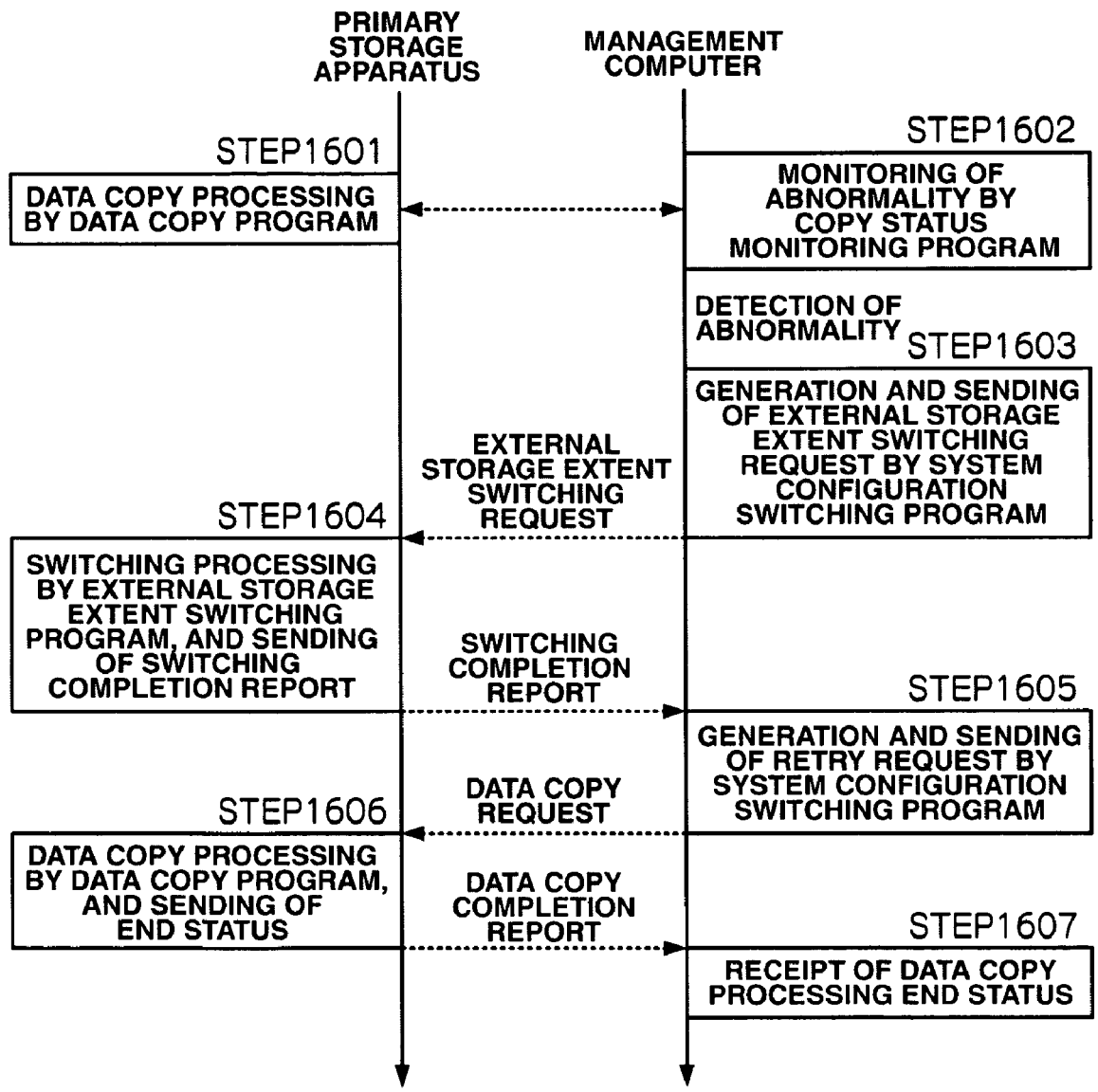
FIG. 16 is a sequence chart explaining an example of backup processing in a computer system according to an embodiment of the invention.

FIG. 16 is a sequence chart explaining an example of backup processing in a computer system 1 according to an embodiment of the invention. FIG. 16 explains processing executed if data copy processing based on a first data copy processing request ends abnormally.

The management computer 6 sends a data copy request to the storage system 3 via execution of the management information communication program P61, for example, in accordance with a predetermined backup schedule. In response to the request, the management information communication program P32 in the storage system 3 executes the data copy program P33, and starts copy processing to replicate data stored in the data storage extent 31a in the virtual replicated data storage extent 31b, as shown in FIG. 16 (STEP 1601). The copy status monitoring program P62 in the management computer 6 periodically monitors the status of the copy processing executed by the data copy program (STEP 1602). If the copy status monitoring program P62 detects an abnormal end, it provides the system configuration switching program P63 with that abnormal end, and the system configuration switching program P63 generates an external storage extent switching request and sends it to the storage system 3 (STEP 1603).

When the management information communication program P32 in the storage system 3 receives the external storage extent switching request, it calls the external storage extent switching program P35. The external storage extent switching program P35 executes external storage extent switching processing based on the external storage extent switching request, and sends a switching completion report to the management computer 6 (STEP 1604).

In response to the switching completion report, the system configuration switching program P63 in the management computer 6 sends the storage system 3 a retry request for the data copy processing (STEP 1605). When receiving the retry request, the data copy program P33 in the storage system 3 executes the copy processing with respect to the external storage extent configuration after the switching. When the data copy processing ends, the data copy program P33 sends a data copy completion report to the management computer 6 (STEP 1606). When the management computer 6 receives the data copy completion report, the overall backup processing ends (STEP 1607). If the second data copy processing executed based on the retry request ends abnormally, the system configuration will be changed again and the data copy processing will be executed for the external storage extent configuration after that change.

Reasons why the data copy processing ends abnormally include, for example, physical and/or logical failures in the storage system 3; line failures in the data transfer network N2; and physical and/or logical failures in the storage system 4. In addition, waiting for the backup processing for data backup from the storage system 4 to the archive appliances 5 to end, physical and/or logical failures in the archive appliances 5, and capacity shortage in the magnetic tapes 52 may also be reasons why the data copy processing ends abnormally.

Next, examples of the operation of a computer system 1 according to an embodiment of the invention will be explained.

A first example is the case where the processing for data copy from the storage system 3 to the storage system 4 ended abnormally, caused by waiting for the processing for data backup from the storage system 4 to the archive appliance 5 to end. In other words, data has been read out from the actual replicated data storage extent 411 in the storage system 4 and transferred to the archive appliance 5 in the data backup processing, so new writing is prohibited to maintain data consistency, and in that case, if the processing is attempted for data copy from the virtual replicated data storage extent 31b in the storage system 3 to the actual replicated data storage extent 411, the above data copy processing will be terminated abnormally.

It is assumed that the actual replicated data storage extent 411 identified by a data storage extent identifier of "B1:02" in the storage system 4 identified by a storage system identifier of "1410" is associated with the magnetic tape 52 identified by a storage medium identifier of "C15" in the archive appliance 5A identified by an archive appliance identifier of "15," as shown in the backup configuration information management table T71 in FIG. 10. The above actual replicated data storage extent 411 identified by the data storage extent identifier "B1:02" is associated with the virtual replicated data storage extent 31b identified by a virtual replicated data storage extent identifier of "A2:02," as shown in the virtualization information management table in FIG. 6. If the data copy program P33 refers to the pairing information management table T32 in FIG. 5, and intends to write data stored in the data storage extent 31a identified by the data storage extent identifier "A1:02" to the virtual replicated data storage extent identified by the virtual replicated data storage extent identifier "A2:02," the actual replicated data storage extent 411 identified by the actual replicated data storage extent identifier "B1:02," to which the above data is to actually be written via the virtualization program P34, is under data-read, so the data copy program P33 updates the corresponding cell in the copy status management table T31 to "ABNORMAL END," and ends the data copy processing.

Upon detecting any data copy processing that ended abnormally, the copy status monitoring program P62 in the management computer 6 obtains the pairing information for the data copy processing, and reports it to the system configuration switching program P63. The system configuration switching program P63 refers to the system configuration information management table T61, generates an external storage extent switching request to change the actual replicated data storage extent identifier "B1:02" in the current pairing information to an actual replicated data storage extent identifier for another available storage extent, and sends the request to the storage system 3. More specifically, the system configuration switching program P63 selects a storage extent identifier of "B1:03," which is in an "UNUSED" state and has a capacity of "200 MB," the same as the capacity for the storage extent identifier "B1:02," from the system configuration information management table T61, and generates an external storage extent switching request for instructing change of the actual replicated data storage extent identifier associated with the virtual replicated storage extent identifier "A2:02" in the virtualization information management table T33, from "B1:02" to "B1:03."

After receiving the external storage extent switching request, the storage system 3 updates the virtualization information management table T33 as shown in FIG. 6B, via the external storage extent switching program P35.

After the virtualization information management table T33 has been updated, the storage system 3 receives a request to retry the data copy processing, and again executes the data copy processing for the data storage extent identifier "A1:02" via the data copy program P33. Then, based on the execution of the data copy program P33, the virtualization program P34 executes the processing for data copy to the actual replicated data storage extent "B1:03."

As described above, in the computer system 1 according to this embodiment, even if the processing for data backup from the storage system 4 to the archive appliance 5 has not been completed, the processing for data copy to the storage system 4 can be executed.

A second example is the case where the processing for data copy from the storage system 3 to the storage system 4 ended abnormally due to a failure or similar in the archive appliance 5. In other words, if the capacity becomes insufficient in the magnetic tape 52 in the archive appliance 5A, to which data in the actual replicated data storage extent in the storage system 4 is to be written in the data backup processing, that data backup processing is interrupted. In that case, the storage system 4 informs the storage system 3 of the reason for the abnormal end, and the storage system 3 updates the copy status management table T31.

For example, if the storage system 4 detects capacity shortage in the magnetic tape 52 identified by a storage medium identifier of "C15" in the archive appliance 5A identified by an archive appliance identifier of "15," which is the transfer destination, the storage system 4 reports to the storage system 3 about the actual replicated data storage extent identifier "B1:02" for the actual replicated data storage extent 411 that is the transfer source. The storage system 3 updates the copy status management table T31, setting "ABNORMAL END" in the status of the processing for data copy to the virtual replicated data storage extent identified by a virtual replicated data storage extent identifier of "A2:02," which is associated with the actual replicated data storage extent identifier "B1:02."

When detecting the above "ABNORMAL END," the copy status monitoring program P62 in the management computer 6 refers to the system configuration information management table T61 via the system configuration switching program P63, selects the magnetic tape 52 identified by a storage medium identifier of "D05," which is different from the storage medium identifier "C15" for the medium whose capacity is insufficient, and sends an external storage extent switching request to the storage system 4. As a result, the actual replicated data storage extent 411 identified by a data storage extent identifier of "B1:04" will be selected as a backup source storage system. Accordingly, the storage system 3 can retry the processing for data copy, but to the actual replicated data storage extent 411 identified by the data storage extent identifier "B1:04" in the virtualization information management table T33.

Next, a modified example of the computer system 1 according to the above-described embodiment will be explained.

Figure 17:
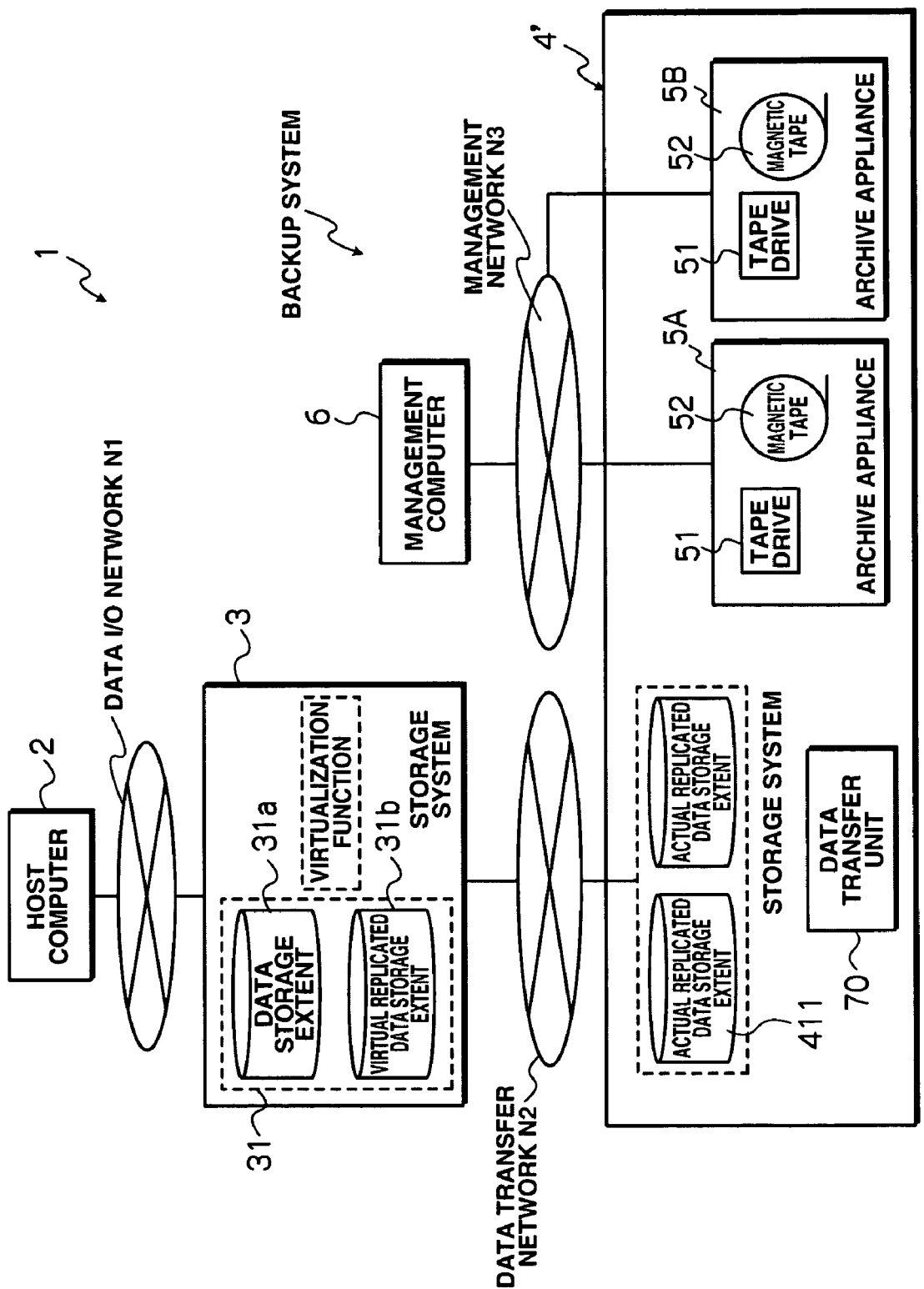
FIG. 17 is a diagram illustrating a computer system according to a modification of the invention.

FIG. 17 is a diagram illustrating the configuration of a computer system 1 according to a modification of the invention. In this modification, a storage system 4' is configured to include a data transfer unit 70 and one or more archive appliances 5. The data transfer unit 70 is provided with a management information communication program P71, an asynchronous data transfer program P72 and a backup configuration information management table T71, and realizes some or all of the functions of the backup control computer 7. The other components are the same as the corresponding components described above, so their explanation will be omitted.

A magnetic disk device 41 in the storage system 4' is functionally connected to the archive appliances 5A and 5B inside the storage system 4,' and under the control of the data transfer unit 70, secondary data backup processing is executed asynchronously to primary data backup processing between the storage system 3 and the storage system 4'.

In the above configuration too, even if a failure occurs during the processing for data backup from the storage system 4' to the archive appliance 5, the processing for data copy to the storage system 4' can be executed.

The present invention can be widely applied in computer systems that employ a primary-secondary backup system. For example, the present invention can be effectively applied to computer systems that employ a D2D2T (Disk to Disk to Tape) system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system comprising:
   a first storage system having a data storage extent for storing data sent from a host computer;
   a second storage system connected to the first storage system, and having at least one actual replicated data storage extent associated with the data storage extent;
   an archive appliance connected to the second storage system and having a storage medium associated with the replicated data storage extent in the second storage system;
   a data copy unit configured to control copy processing for reading data from the data storage extent in the first storage system and writing the read data to a first actual replicated data storage extent in the second storage system in accordance with specific configuration information;
   a connection switching unit configured to change the specific configuration information so that a second actual replicated data storage extent, instead of the first actual replicated data storage extent, is associated with the data storage extent; and
   a data transfer unit configured to control backup processing for storing data from the second actual replicated data storage extent to a storage medium, in the archive appliance, which is associated with the second actual replicated data storage extent in accordance with the specific configuration information.

2. The computer system according to claim 1, further comprising:
   a backup control unit configured to control backup processing for reading data from the first actual replicated data storage extent in the second storage system and to store the read data in the storage medium in the archive appliance.

3. The computer system according to claim 2,
   wherein the backup control unit controls the backup processing asynchronously to the copy processing controlled by the data copy unit.

4. The computer system according to claim 3,
   wherein, if the copy processing for writing data to the second storage system ends abnormally, the connection switching unit changes the specific configuration information.

5. The computer system according to claim 3,
   wherein, if the backup processing for storing data in the archive appliance ends abnormally, the connection switching unit changes the specific configuration information.

6. The computer system according to claim 3, further comprising:
   a monitoring unit for monitoring for an abnormal end in the copy processing controlled by the data copy unit,
   wherein the connection switching unit changes the specific configuration information if the monitoring unit detects an abnormal termination.

7. The computer system according to claim 6,
   wherein the connection switching unit requests new copy processing of the data copy unit if the specific configuration information has been changed by the connection switching unit.

8. The computer system according to claim 1,
   wherein the first storage system has a virtual replicated data storage extent associated with the data storage extent, and the virtual replicated data storage extent is associated with the at least one actual replicated data storage extent.

9. A data management method in a computer system provided with a first storage system having a data storage extent, a second storage system connected to the first storage system and having at least one actual replicated data storage extent, and an archive appliance connected to the second storage system and having a specific storage medium, the data management method comprising:
   setting specific configuration information so that the data storage extent in the first storage system is associated with a first actual replicated data storage extent in the second storage system, and the first actual replicated data storage extent is associated with the specific storage medium in the archive appliance;

storing data sent from a host computer in the data storage extent;

executing copy processing for reading data from the data storage extent in the first storage system and writing the read data to the first actual replicated data storage extent in the second storage system in accordance with the specific configuration information;

detecting if the copy processing has ended abnormally or not;

changing the specific configuration information so as to associate a second actual replicated data storage extent, instead of the first actual replicated data storage extent, with the data storage extent, if the copy processing is detected as having terminated abnormally; and executing backup processing by storing a data from the second actual replicated data storage extent to a storage medium, in the archive appliance, which is associated with the second actual replicated data storage extent in accordance with the specific configuration information.

10. The data management method according to claim 9, wherein the backup processing is executed asynchronously to the copy processing.

11. The data management method according to claim 10, wherein the changing the specific configuration information changes the specific configuration information if the copy processing for writing data to the second storage system terminates abnormally.

12. The data management method according to claim 10, wherein the changing the specific configuration information changes the specific configuration information if the backup processing for storing data in the archive appliance terminates abnormally.

13. The data management method according to claim 10, further comprising:

monitoring for an abnormal end in the copy processing, wherein the changing the specific configuration information changes the specific configuration information if an abnormal termination is detected during the monitoring for an abnormal end.

14. The data management method according to claim 9, further comprising:

forming a virtual replicated data storage extent in the first storage system, the virtual replicated data storage extent being associated with the data storage extent, and associating the virtual replicated data storage extent with the first actual replicated data storage extent.

15. The data management method according to claim 13, further comprising:

executing, after the specific configuration information has been changed, copy processing for reading data from the data storage extent in the first storage system and writing the read data to the second actual replicated data storage extent in the second storage system in accordance with the changed specific configuration information.

* * * * *